United States Patent [19]
Townsend

[11] 4,171,113
[45] Oct. 16, 1979

[54] SHIFT MECHANISM FOR AIRCRAFT CONTROL SYSTEM

[75] Inventor: Richard E. Townsend, Huntington, N.Y.

[73] Assignee: The United States of America as represented by the Secretary of the Air Force, Washington, D.C.

[21] Appl. No.: 898,048

[22] Filed: Apr. 20, 1978

[51] Int. Cl.² ............................................ B64C 13/28
[52] U.S. Cl. .............................. 244/83 G; 74/471 R; 244/83 H
[58] Field of Search ............... 244/83 R, 83 C, 83 A, 244/83 G, 83 H, 83 J, 82, 78, 196, 197, 84, 85; 74/469, 471 R; 180/77 R, 77 M

[56] References Cited
U.S. PATENT DOCUMENTS

| | | | |
|---|---|---|---|
| 2,120,717 | 6/1938 | Sikorsky | 244/87 |
| 2,395,671 | 2/1946 | Kleinhans et al. | 244/82 |
| 2,437,536 | 3/1948 | Johnson et al. | 244/83 R X |
| 2,609,165 | 9/1952 | Hill | 244/85 X |
| 2,621,872 | 12/1952 | Terdina et al. | 244/82 |
| 2,669,401 | 2/1954 | Bosserman | 244/82 |
| 2,674,900 | 4/1954 | Unterman | 74/469 |
| 2,940,698 | 6/1960 | Lawrence et al. | 244/83 G |
| 3,000,595 | 9/1961 | Dorn | 244/82 |
| 3,020,889 | 2/1962 | Summerlin et al. | 244/85 X |
| 3,166,272 | 1/1965 | Liddell et al. | 244/83 |
| 3,273,831 | 9/1966 | Vernon et al. | 244/83 R |
| 3,554,469 | 1/1971 | Snow | 244/83 |
| 3,611,828 | 10/1971 | Maroshick | 244/84 X |
| 3,618,880 | 11/1971 | Hagaman et al. | 244/113 |
| 3,790,108 | 2/1974 | Bock | 244/83 D |
| 3,861,705 | 1/1975 | Burchard et al. | 74/469 X |

*Primary Examiner*—Barry L. Kelmachter
*Attorney, Agent, or Firm*—Joseph E. Rusz; Jacob N. Erlich

[57] ABSTRACT

A shift mechanism for an aircraft control system for reversibly shifting the control system of the aircraft between a power mode and a manual mode of operation. The shift mechanism has a stick control input connection, a primary control surface output connection and a secondary control surface output connection. The input connection is made to a bell crank-shaped housing which is pivoted to the aircraft structure and the output connections are connected to an idler arm and connecting member, respectively, that are pivoted to the housing. The connecting member is moved by an actuator between a first position wherein its pivotal connection to the secondary control surface output connection is aligned with the pivotal connection of the housing to the aircraft and a second position of non-alignment. During this second position, the primary control surface output connection is disconnected from the idler arm. As a consequence, during the first position of the connecting member the primary control surface is responsive to the movement of the housing (power mode) while during the second position of the connecting member the secondary control surface is responsive to the movement of the housing (manual mode).

10 Claims, 8 Drawing Figures

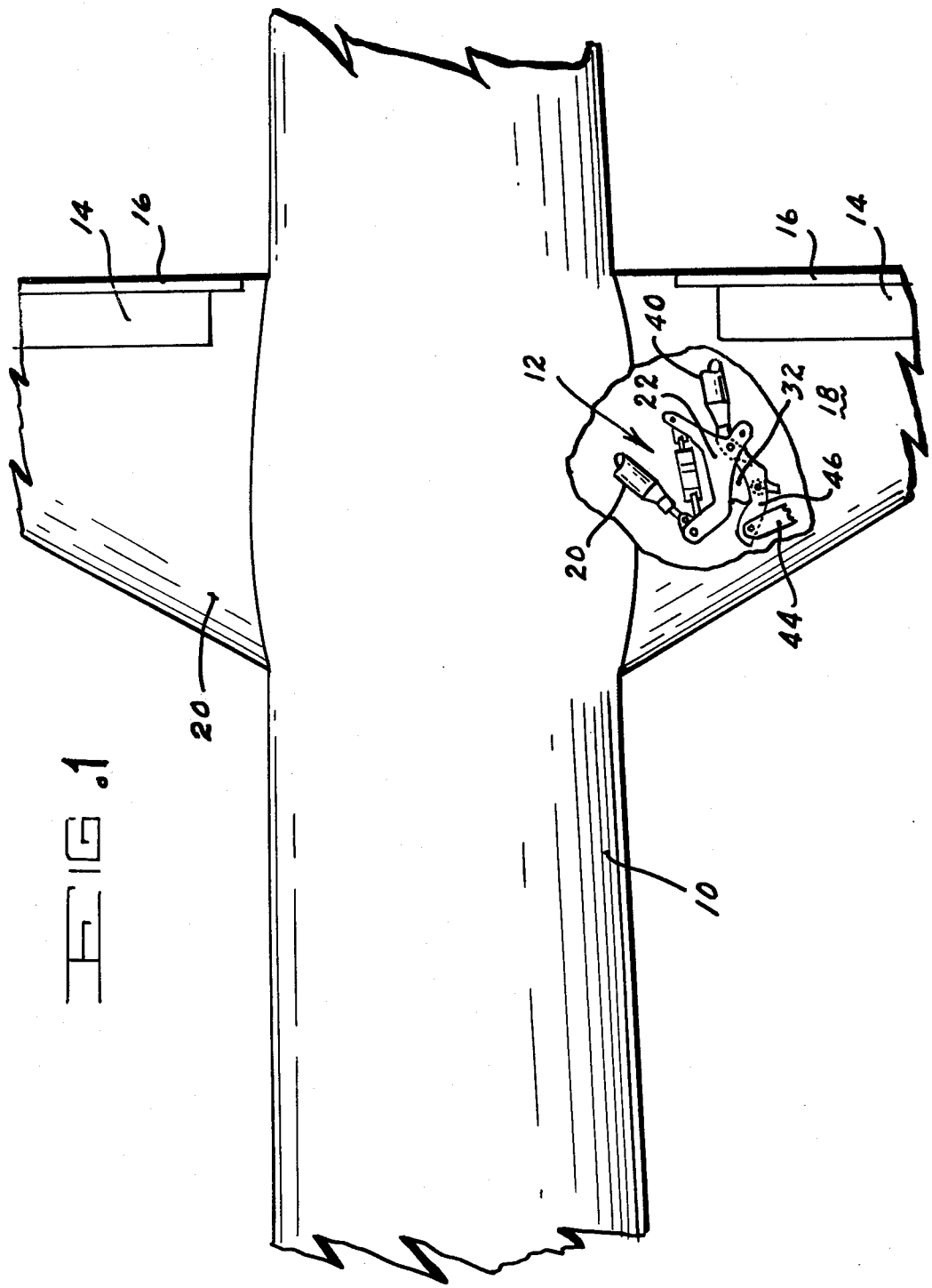

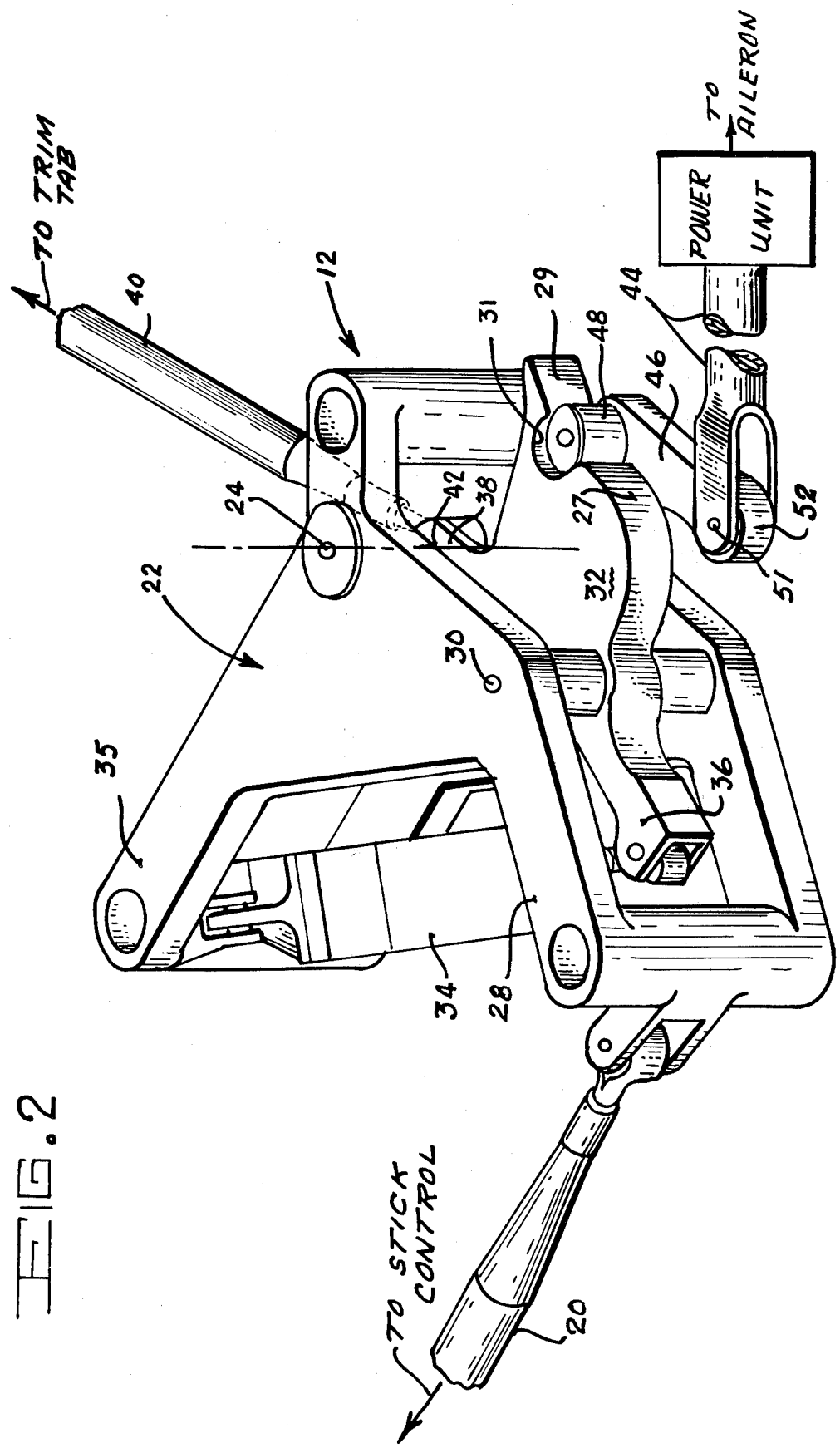

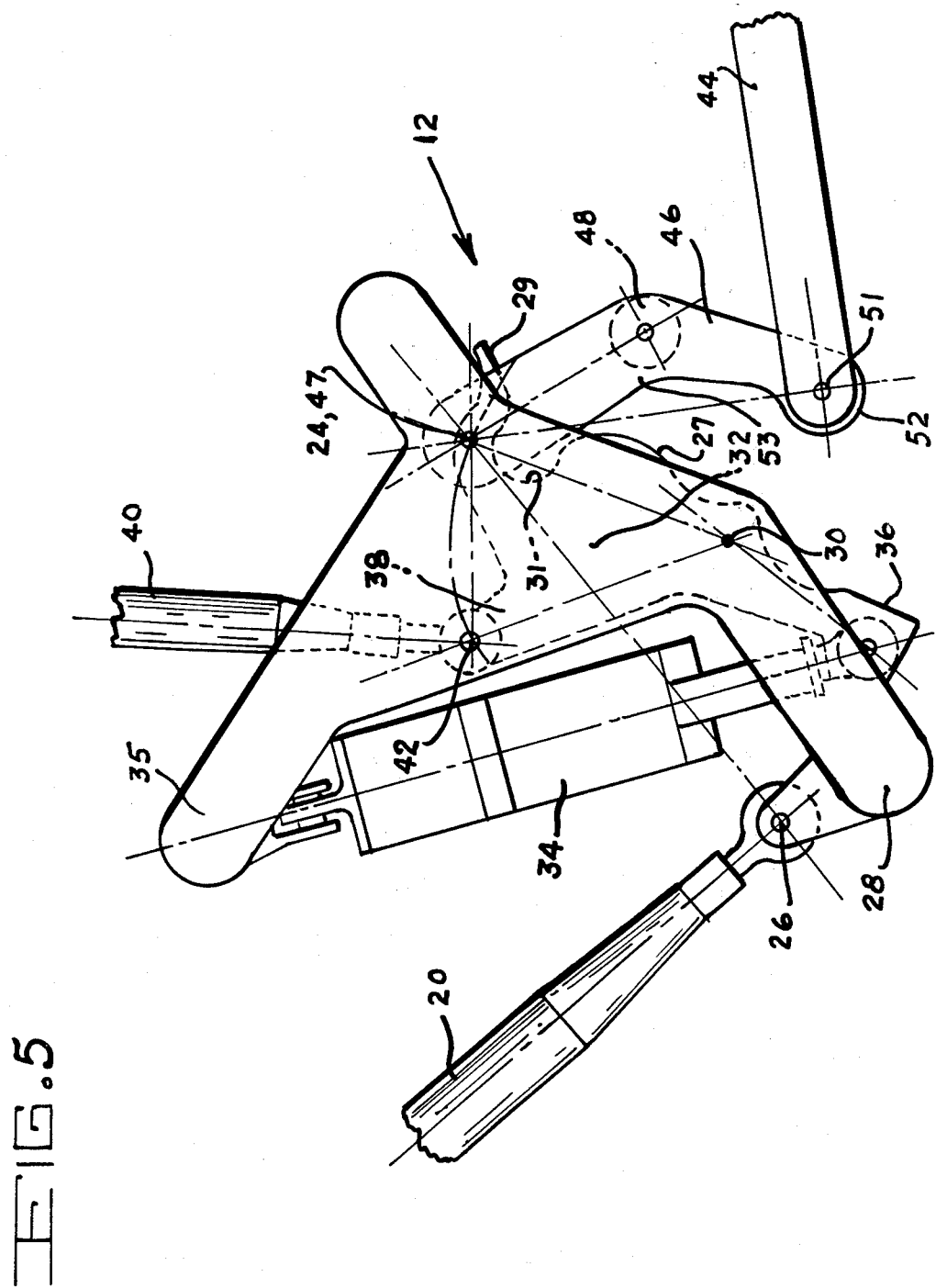

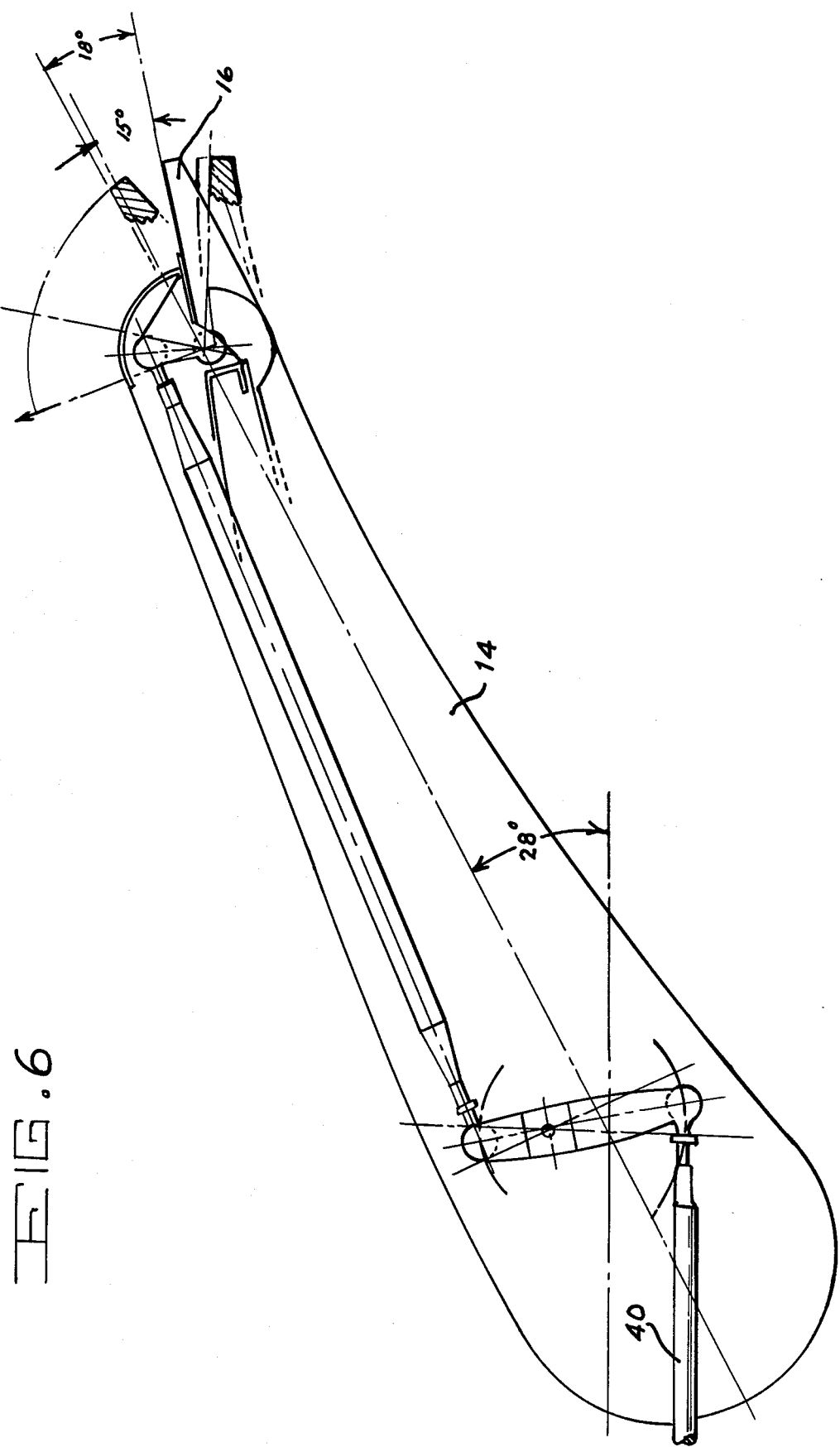

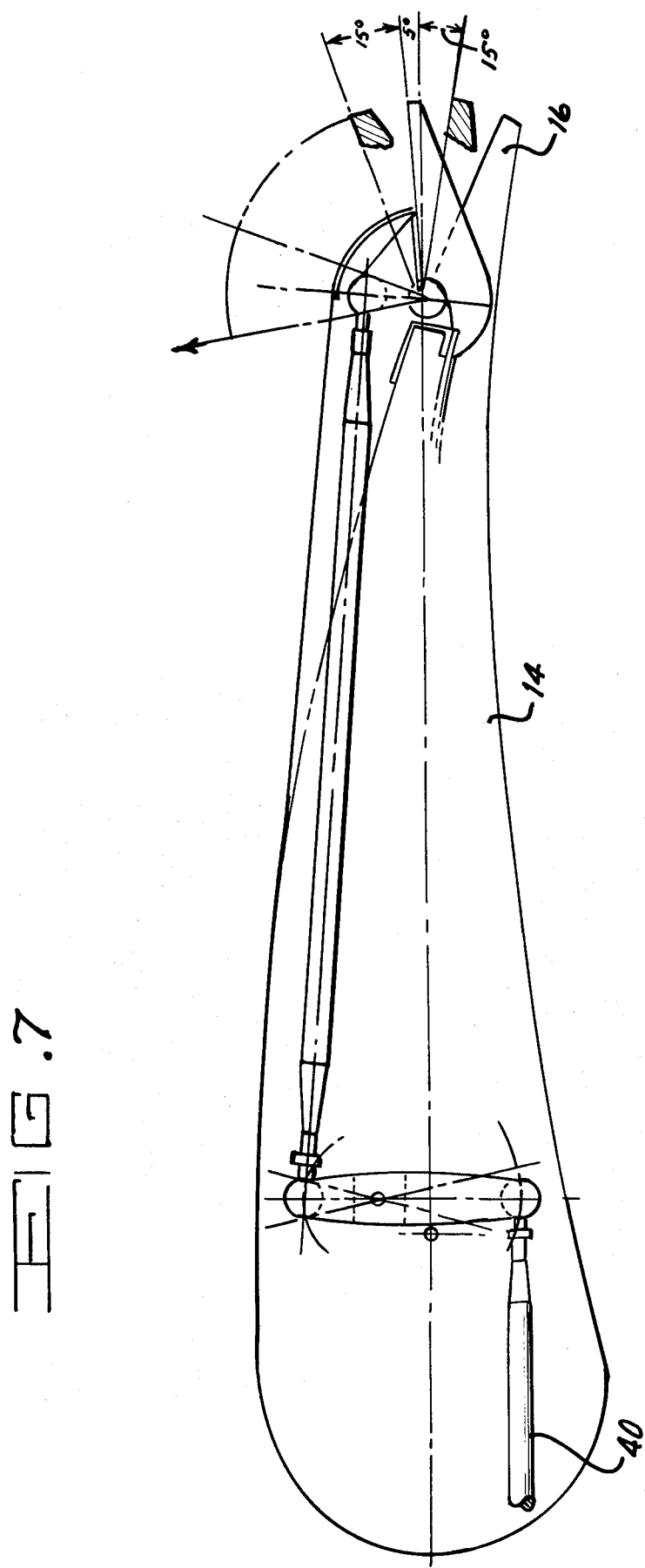

SHIFT MECHANISM FOR AIRCRAFT CONTROL SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to aircraft control systems, and, more particularly to a shift mechanism capable of reversibly shifting the control system of an aircraft between a power mode of operation and a manual mode of operation.

A primary source of aircraft control resides in the aileron of an aircraft. The ailerons are the hinged rear portions of an aircraft wing, moved differentially on each side of the aircraft to obtain the lateral or roll control moments thereof. The angular settings of the ailerons are controlled by the operator (pilot) through a flight control system.

The operating principles of the ailerons are the same as for all trailing-edge hinge controlled devices on the aircraft. Deflection of an aileron changes the effective camber, or airfoil curvatuve relative to the wing chord, of the entire wing forward of the aileron. With a trailing-edge deflective upward, reduced local flow velocities are produced on the upper wing surface, and increased local flow velocities are produced on the lower wing surface. By Bernoulli's law, this results in a reduction of lift over the portion of the wing forward of the aileron, and on the aileron itself. Conversely, trailing-edge down deflection of a flap-type aileron increases the lift in the same areas. When the trailing-edge is raised on one wing, the trailing-edge of the aileron on the opposite wing is lowered by a corresponding amount. The decrease in lift on one wing is accompanied by lift increase on the other wing.

As the size of aircrafts continue to increase, the control surfaces such as the wing and associated ailerons have increased in size correspondingly. As a result, devices have been employed to assist the pilot in effecting movement of the aircraft control surfaces. The first type, may be designated as a power mechanism or power unit and may include hydraulic or electrical power devices energized by the movement of the pilot control stick which will therefore exert on the control surface a force much greater than which the pilot is capable himself.

The second type of assisting mechanism is considered a manual control which is in the form of a trim tab connected to the rear portion of the ailerons. Swinging of such a tab in one direction will exert a torque on the main control surface of the aileron tending to swing it in the opposite direction. Since the size of the tab is substantially smaller than the size of the aileron its manual control can be accomplished by operation of the pilot directly from the stick.

Since power units on occasion may fail it becomes essential that the pilot have direct control of the trim tab associated with the aileron. Therefore, a shift mechanism for release or disconnect mechanism must be provided in the aircraft to shift the aircraft from a power mode of operation to a manual mode of operation in a swift and efficient manner. Heretofore, the mechanisms involved for shifting between a power to a manual mode of operation have left much to be desired. For example, in many instances these shift mechanisms have been highly complex and therefore prone to failure, thus becoming, themselves unreliable in operation. In addition, the shift mechanism must operate to shift the control systems between a power mode and a manual mode in a matter of seconds. Any lost time could result in dire consequences to the pilot, personnel aboard and the aircraft itself. Also, many shift mechanisms in use today are irreversible in operation.

SUMMARY OF THE INVENTION

The instant invention overcomes the problems encountered in the past and as set forth hereinabove by providing a shift mechanism for the control system of an aircraft which is designed to provide highly reliable, efficient and quick response in order to alter the mode of operation of the control system of an aircraft between the power and manual mode. Additionally, this shift mechanism is completely reversible in operation.

In general, two substantially identical shift mechanisms are required in the operation of the control system of an aircraft. One shift mechanism being operably attached to the left aileron and trim tab and the other shift mechanism attached to the right aileron and trim tab associated therewith. The two shift mechanisms are connected in a conventional manner to a standard control stick or control actuator for operation by the pilot. In addition, it should be realized that although the shift mechanism of the instant invention is described with reference to the ailerons of an aircraft, this shift mechanism may be associated with any other control surfaces of an aircraft or the like.

Each shift mechanism is made up of a bell crank-shaped housing pivotally connected to the aircraft structure. A conventional stick control input rod is operably connected to one end of the bell crank-shaped housing. The bell crank-shaped housing pivotally supports therein a movable connecting member, an actuator and an idler arm. The actuator is operably connected between a portion of bell crank-shaped housing and the movable connecting member. This actuator may be either hydraulic or electro-mechanical in operation and effects the transfer from the normal or power mode of operation to the manual mode of operation, and visa-versa, in a manner to be described in detail hereinbelow.

The movable connecting member provides a support point for a push-pull rod leading to a conventional "geared" aileron trim tab. During the normal or power mode of operation the pivotal connection of aileron trim tab rod is held coincidental with the bell crank-shaped housing pivot point and, as a result thereof, there is no motion imparted to the aileron tab push-pull rod as the bell crank-shaped housing rotates in response to the pilot's input. Likewise, there is no force feed back from the aileron tab to effect forces sensed by the pilot at the control stick.

In addition to the support for the aileron trim tab rod the movable connecting member also has a pair of cam surfaces and a locking recess therein, which, in the normal or power position serves to lock a cam follower roller affixed to the output idler arm such that the idler arm must rotate with and as part of the main bell crank-shaped housing. As a result of this connection the pilot's input by means of the stick control input rod to the bell crank-shaped housing is directly transmitted to an aileron output push rod which is connected to the output idler arm. This push rod in turn provides input signals to a conventional power unit attached to the aileron itself.

If, at the discretion of the pilot or after actual loss of power within the aileron power unit or for other reasons the actuator of the shift mechanism of this invention is energized. Operation of the actuator transfers the pilot's stick command to effect movement to the aileron tab push-pull rod and disengage the aileron power unit actuator connection from the bell crank-shaped housing. This transition occurs in a smooth fashion with separation of the aileron power unit actuator rod at the start of the transition with a progressive increase in the control with which a pilot has over the motion of the aileron tab. This transition can take place in as little as three to four seconds in either direction, that is from the normal power mode to the manual mode of operation or from the manual mode of operation to the power mode of operation. The shift mechanism of this invention is fully reversible from any setting or partial setting and is capable of regaining control of the aileron power unit actuator rod regardless of the position the rod was in with relation to the pilot's control stick position. This is accomplished by the cam surfaces which are configurated so as to recapture the aileron output idler arm regardless of the aileron setting.

It is therefore an object of this invention to provide a shift mechanism for the control system of an aircraft which is capable of reliably transferring the pilot's input commands to either a power mode or a manual mode of operation.

It is another object of this invention to provide a shift mechanism for the control system of an aircraft which is completely reversible in operation.

It is a further object of this invention to provide a shift mechanism for the control system of an aircraft which because of its limited amount of movable parts is extremely reliable and responsive in operation.

It is still another object of this invention to provide a shift mechanism for a control system of an aircraft which is economical to produce and which utilizes conventional, currently availble component that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWINGS

FIG. 1 is a pictorial representation of the shift mechanism of this invention in exaggerated fashion located within an aircraft structure showing its relationship with respect to the aileron and aileron trim tab of the wing of an aircraft;

FIG. 2 is a partially fragmented, pictorial representation of the shift mechanism of this invention for the control system of an aircraft;

FIG. 5 is a top view of the shift mechanism of this invention for a control system of an aircraft and shown in the manual mode of operation; and FIGS. 6, 7 and 8 are side elevational views shown partly in cross-section of the aileron tab control rod in three positions of operation, respectively.

DETAILED DESCRIPTION OF THE PREFERRED EMBODIMENT

Figure 4:
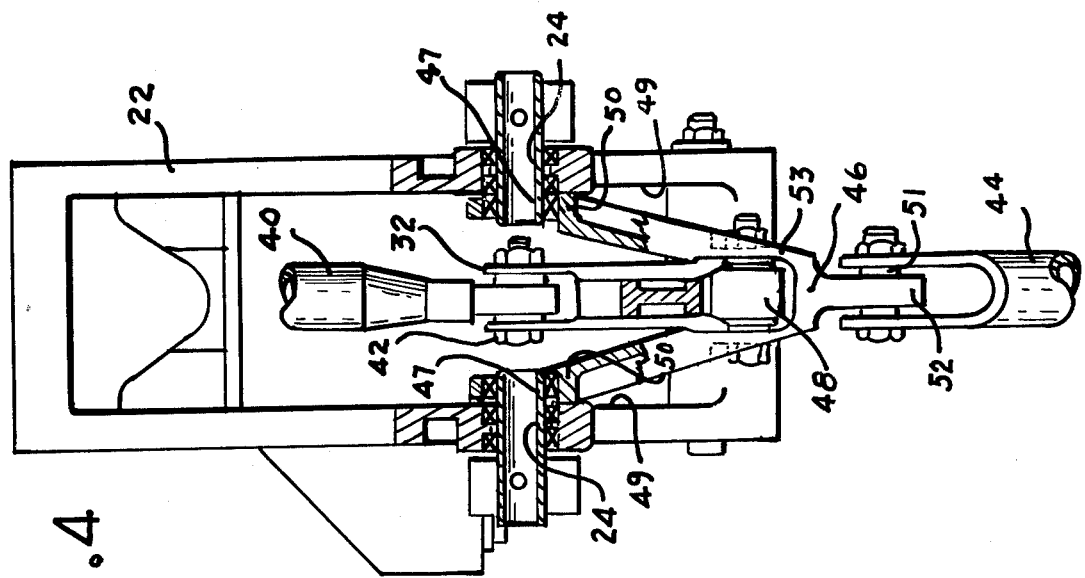
FIG. 4 is an end view of the shift mechanism of this invention for the control system of an aircraft taken along line IV—IV of FIG. 3 and shown partially in cross-section.

Reference is now made to FIG. 1 of the drawing which shows in a schematic fashion an aircraft 10 which utilizes therein the shift mechanism 12 of this invention. As depicted in exaggerated fashion in FIG. 1 of the drawing shift mechanism 12 is located in the aircraft structure adjacent the aircraft aileron 14 and trim tab 16. It is necessary in the operation of aircraft 10 that two such shift mechanisms 12 be incorporated in the aircraft design. One shift mechanism, as shown in FIG. 1 of the drawing is located in operative relationship with aileron 14 and aileron trim tab 16 of one wing 18 of aircraft 10 while the other shift mechanism (not shown in the drawing) is associated with the other wing 20 and its related aileron 14 and aileron trim tab 16.

In normal aircraft operation the control of aircraft 10 is regulated by the displacement of the aileron 14 associated with each wings 18 and 20, respectively. Since the size of aircraft 10 prohibits actual manual movement of these ailerons, a conventional power unit 21, as shown schematically in FIG. 2, is associated with the control system of aircraft 10. Power unit 21 functions to cause the system to adjust the control surfaces in substantially the same manner as it would function if manually operated by the control lever or stick within the aircraft. In most conventional aircrafts the power unit associated with each aileron 14 is in the form of a hydraulic actuating system or the like. Normal adjustment of the movable control surfaces of aircraft 10 is accomplished entirely by the power unit which is operably connected to the control lever or stick which merely serves to regulate or control the operation of this unit.

As stated hereinabove if for some reason the power unit 21 should fail or if for some reason the pilot wishes to disconnect power unit 21 entirely, other means must be associated with the aileron 14 or control surfaces so that these surfaces may be operated manually. The manual operation of these control surfaces usually take the form of an aileron trim tab 16 which is operatively connected in a "geared" relationship with aileron 14 itself. By "geared" it is meant that the movement of the aileron tab 16 has a subsequent proportional effect on displacement of the aileron 14. The instant invention resides in shift mechanism 12 which is operably connected between the control stick, the aileron 14 and the aileron trim tab 16 in such a manner as to allow rapid disconnection of power unit 21 and connection between the control stick and the aileron trim tab 16. As a result, the manual inputs to the control stick are directly connected to trim tab 16 which due to the aerodynamic forces acting thereon produce subsequent movement of the aileron 14.

Figure 3:
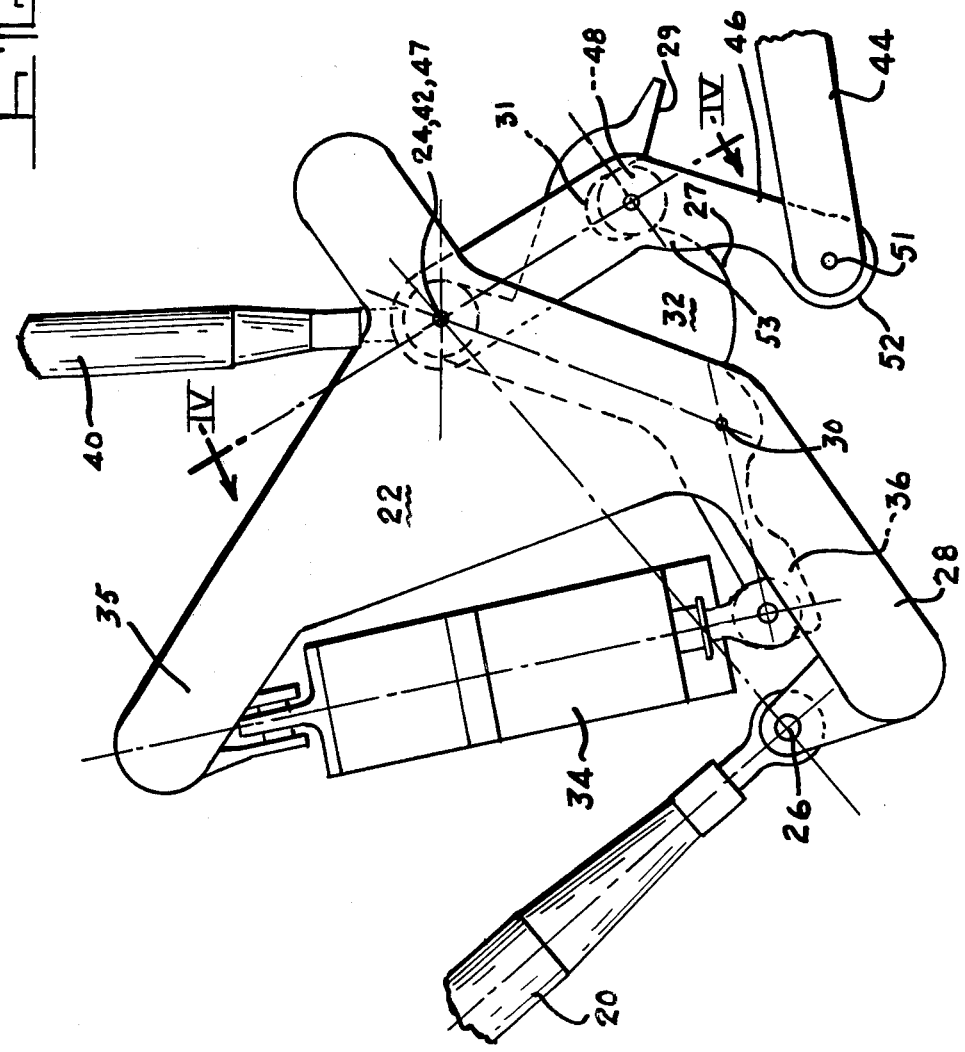
FIG. 3 is a top view of the shift mechanism of this invention for the control system of an aircraft in the normal or power mode of operation.

Reference is now made to FIGS. 2 thru 4 of the drawing which clearly illustrate the shift mechanism 12 of this invention. In FIGS. 2-4, shift mechanism 12 is in the normal or power mode in which power unit 21 is directly connected to input control rod 20. Shift mechanism 12 is made up of a bell crank-shaped housing 22 which is pivotally mounted within the aircraft structure by any suitable pivotal connection 24. Stick control input rod 20 is pivotally mounted at 26 to a leg 28 of bell crank-shaped housing 22. In addition, housing 22 has a pair of cam surfaces 27 and 29 and a locking recess 31 to be explained in detail hereinbelow.

Pivotally mounted at connection 30 within bell crank-shaped housing 22 is a movable connecting member 32. Any suitable hydraulic or electromechanical actuator 34 is interconnected between another leg 35 of bell crank-shaped housing 22 and an arm 36 of movable connecting member 32. Pivotally connected at 42 to another arm 38 of connecting member 32 is trim tab output control rod 40. It is essential that this pivotal connection 42 be situated coincidental with pivotal connection 24 of bell crank-shaped housing to the aircraft structure when the shift mechanism 12 is in its normal position (as shown in FIGS. 2–4) and the control input rod 20 is operably connected to the aileron output rod 44.

A Y-shaped output idler arm 46 is pivotally connected at 47 to the inner surfaces 49 of bell crank-shaped housing 22 at one end 50 thereof and movably connected at 51 to the aileron output rod 44 at the other end 52 thereof. At the juncture 53 of the Y a cam follower roller 48 is formed within idler arm 46. Cam follower 48 operates in conjunction with the pair of cam surfaces 27 and 29 located within the movable connecting member 32. In addition, during the normal mode of operation shown in FIGS. 2 thru 4 of the drawing cam follower 48 is situated within locking recess 31 located between cam surfaces 27 and 29 within movable connecting member 32.

As shown in FIGS. 2 through 4 of the drawing when shift mechanism 12 of this invention is in the normal or power mode of operation there is an operable connection between stick control input rod 20 and aileron output rod 44 whereby movement of stick 20 produces a direct movement of aileron output rod 44. Movement of stick 20 thereby activates in a conventional manner power unit 21 which is connected to the aileron 14 of aircraft 10. Although only one such shift mechanism 12 is shown in detail in the drawing and described hereinabove, it should be realized that a pair of such shift mechanisms 12 are essential in the operation of an aircraft. However, since both shift mechanisms 12 are identical in design and operation and are both controlled by the operation of the stick by the pilot it is unnecessary to set forth in detail the operation of both shift mechanisms 12. It should also be realized that although two shift mechanisms 12 are located within the aircraft their subsequent outputs to ailerons 14 perform mirror-image operations, that is, when the left aileron is raised, the right aileron is subsequently lowered the same amount. This operation is a conventional operation in all aircraft.

Figure 8:
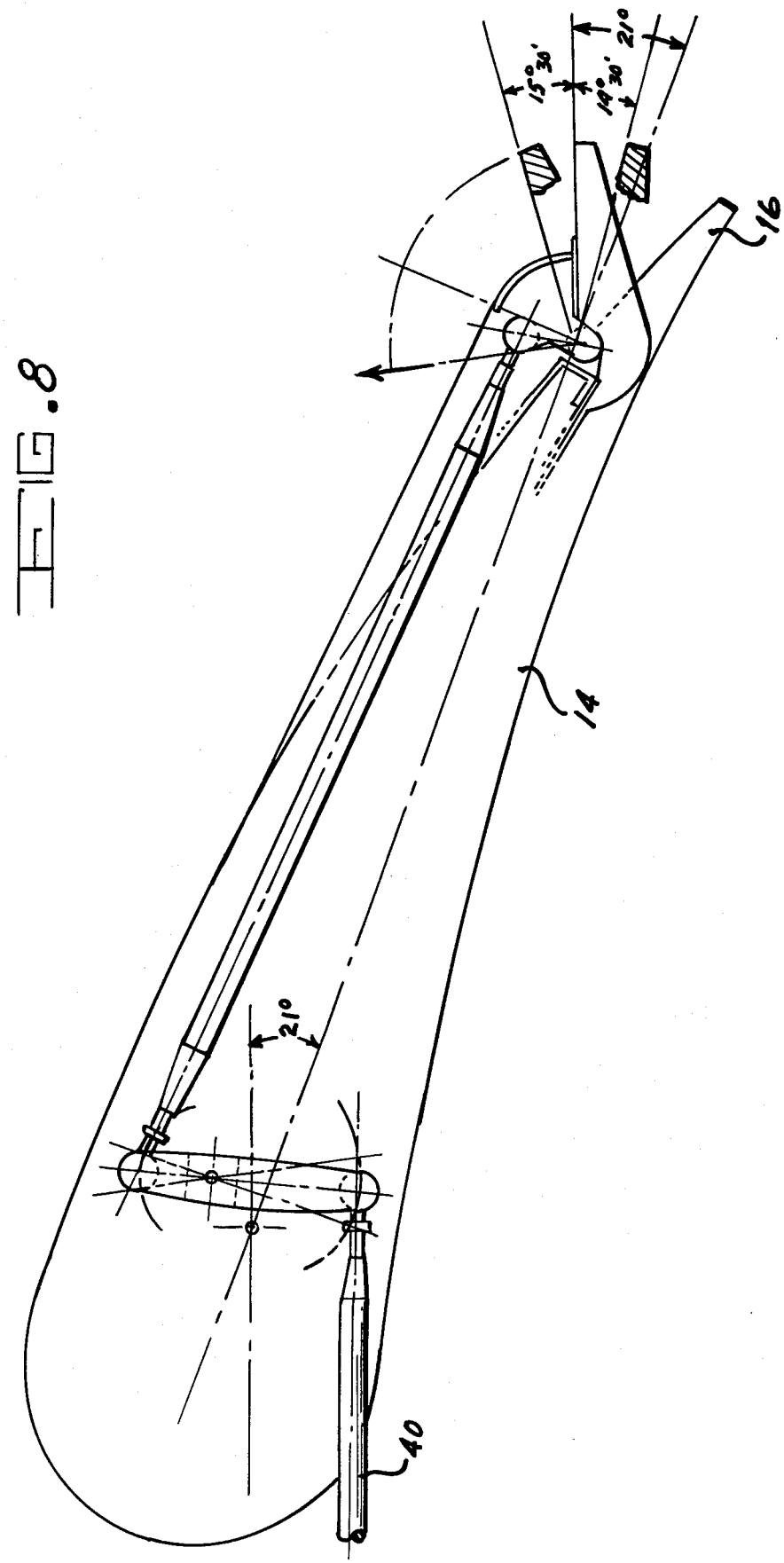

During the normal or power mode of operation as shown in FIGS. 2 through 4 of the drawing because of the novel locked relationship between movable connecting member 32 and aileron output rod 44 and the position of actuator 34, trim tab output rod 40 is held coincidental with pivot 24 of the bell crank-shaped housing 22. As a result thereof no motion is imparted to the aileron trim tab 16 via the trim tab output rod 40 when the bell crank-shaped housing 22 rotates in response to the pilot's input to the stick. Likewise, there is no force feedback from aileron tab 16 to effect forces sensed by the pilot at the stick. Since the trim tab output rod 40 is now, in a sense, fixedly secured to the pivotal connection 24 and therefore the aircraft structure, subsequent movement of aileron 14 will cause the reverse movement of aileron tab 16 in a conventional manner and as shown in FIGS. 6–8 of the drawing.

At the discretion of the pilot, after, for example, loss of power in power unit 21 or for any other reason, the pilot may actuate the hydraulic or electromechanical actuator 34 thereby pivoting movable connecting member 32 about its pivotal connection 30 to the position shown in detail in FIG. 5 of the drawing. When this action takes place idler arm 46 is cammed out of its locked position and into a free swinging mode of operation about pivotal connection 47. Also as a result of this operation trim tab output rod 40 is rotated out of alignment with pivotal connection 24 as shown in FIG. 5 of the drawing.

As shown in FIG. 5 subsequent movement of stick control input rod 20 now results in the movement of housing 22 as well as connecting member 32 and trim tab output rod 40. In addition a complete disconnection of aileron output rod 44 from the movements of stick control input rod 20. Due to the relatively few moving parts in shift mechanism 12 of this invention transition from the normal or power mode of operation to the manual mode of operation takes place in as short of time as three to four seconds in either direction.

Since the only connection between the input rod 20 is now to the aileron trim tab output rod 40 subsequent movement of the stick by the pilot will effect direct movement of trim tab 16, a relatively easy procedure for the pilot. As shown in FIGS. 6 through 8 of the drawing the movements of trim tab 16 will effect the movement of aileron 14 as a result of the aerodynamic forces acting thereon in a conventional manner well-known in the aircraft art. The disconnection of aileron output rod 44 allows this action to take place with relative ease.

Shift mechanism 12 of this invention is also fully reversible in operation from any setting, or partial setting and is capable of regaining the control of aileron output rod 44 to the stick control input rod 20. This is accomplished by cam surfaces 27 and 29 which operate in conjunction with cam follower 48 located on idler arm 46. To effect this reverse movement, that is from the manual mode of control to the power mode of control shift actuator 34 is deenergized causing the subsequent pivotal movement of connecting member 32 about pivot 30 so that cam surfaces 27 and 29 bring cam follower 48 back into engagement within locking recess 31 of idler arm 46. As this movement takes place movable connecting member 32 also brings the pivotal connection 42 between trim tab output rod 40 and connecting member 32 back into alignment with pivotal connection 24 of bell crank-shaped housing 22.

It is therefore clearly shown that shift mechanism 12 of this invention is capable of rapidly connecting or disconnecting the stick output rod 20 from either a power mode of operation (operably connected to the aileron output rod 44 as shown in FIGS. 2 thru 4 of the drawing) or to a manual mode of operation with (operably connected to the aileron trim tab output rod 40 as shown in FIG. 5 of the drawing). Such an operation allows the pilot full control of the operation of aircraft 10 whether in the power or manual mode of operation. Since shift mechanism 12 of this invention relies on relatively few moving parts for its operation virtually fail safe operation is assured.

Although this invention has been described with reference to a particular embodiment, it will be understood to those skilled in the art that this invention is also capable of further and other embodiments within the spirit and scope of the appended claims.

I claim:

1. In an aircraft havng a control actuator, a primary control surface, a secondary control surface and a power unit operably connected between said control actuator and said primary control surface, the improvement therein being in the form of a shift mechanism operably connected between said control actuator and said primary and said secondary control surfaces for reversibly shifting said control actuator between a power mode of operation wherein said primary control surface is responsive to signals from said control actuator and a manual mode of operation wherein said secondary control surface is responsive to signals from said control actuator, said shift mechanism comprising a housing pivotally connected to said aircraft, means operably connected between said control actuator and said housing for moving said housing about its pivotal connection in response to said signals from said control actuator, a connecting member pivotally connected to said housing, means operably connected between said housing and said connecting member for moving said connecting member between a first and a second position, means pivotally connected to said connecting member for operably connecting said secondary control surface to said connecting member, said pivotal connection between said connecting member and said secondary control surface connecting means being coincidental with said pivotal connection of said housing to said aircraft when said connecting member is in said first position, an idler arm pivotally connected to said housing and in operative relationship with said connecting member, said pivotal connection of said idler arm to said housing being coincidental with said pivotal connection of said housing to said aircraft and means pivotally connected to said idler arm for operably connecting said power unit to said idler arm whereby when said connecting member is in said first position said primary control surface is responsive to the movement of said housing and when said connecting member is in said second position said secondary control surface is responsive to the movement of said housing.

2. In an aircraft as defined in claim 1 wherein said connecting member further comprises a pair of cam surfaces and a locking recess located therebetween, said idler arm having a cam follower thereon, said cam follower being situated within said recess of said connecting member when said connecting member is in said first position.

3. In an aircraft as defined in claim 2 wherein said pivotal connection between said connecting member and said secondary control surface connecting means is disposed a predetermined distance from said pivotal connection of said housing to said aircraft when said connecting member is in said second position.

4. In an aircraft as defined in claim 3 wherein said cam follower of said idler arm is disengaged from said recess in said connecting member when said connecting member is in said second position.

5. In an aircraft as defined in claim 4 wherein said primary control surface is an aileron and said secondary control surface is a trim tab connected to said aileron.

6. In an aircraft as defined in claim 5 wherein said means for moving said connecting member is in the form of a hydraulic actuator.

7. A shift mechanism comprising a housing, said housing being pivotally connected to a support structure, means operably connected between an actuator and said housing for moving said housing about its pivotal connection in response to signals from said actuator, a connecting member pivotally connected to said housing, means operably connected between said housing and said connecting member for moving said connecting member between a first and a second position, said connecting member being pivotally connected to a first driven member, said pivotal connection between said connecting member and said first driven member being coincidental with said pivotal connection of said housing to said support structure when said connecting member is in said first position, an idler arm pivotally connected to said housing and in operative relationship with said connecting member, said pivotal connection of said idler arm being coincidental with said pivotal connection of said housing to said support structure and said idler arm being pivotally connected to a second driven member whereby when said connecting member is in said first position said second driven member is responsive to the movement of said housing and when said connecting member is in said second position said first driven member is responsive to the movement of said housing.

8. A shift mechanism as defined in claim 7 wherein said connecting member further comprises a pair of cam surfaces and a locking recess located therebetween, said idler arm having a cam follower thereon, said cam follower being situated within said recess of said connecting member when said connecting member is in said first position.

9. A shift mechanism as defined in claim 8 wherein said pivotal connection between said connecting member and said first driven member is disposed a predetermined distance from said pivotal connection of said housing to said support structure when said connecting member is in said second position.

10. A shift mechanism as defined in claim 9 wherein said cam follower of said idler arm is disengaged from said recess in said connecting member when said connecting member is in said second position.

* * * * *